(No Model.)
W. J. PERKINS.
CARRIAGE FOR SHINGLE SAWING MACHINES.
No. 350,767. Patented Oct. 12, 1886.
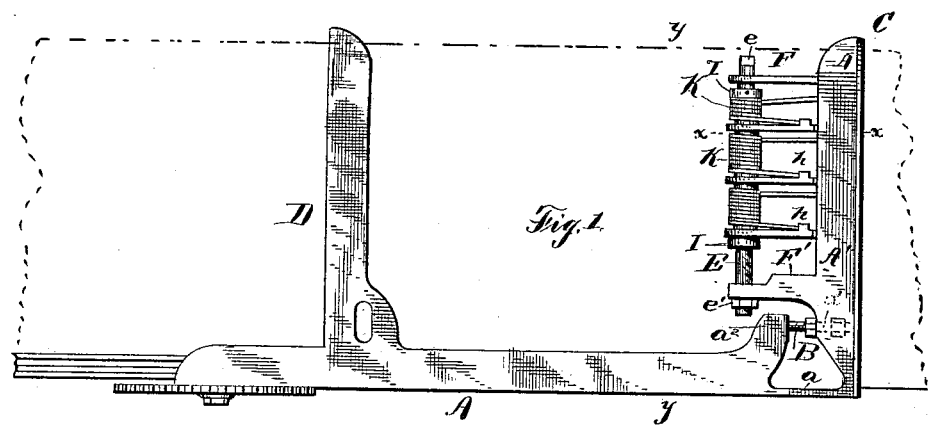
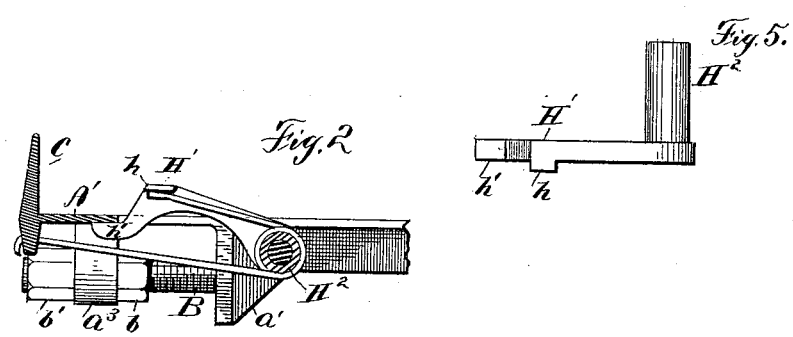
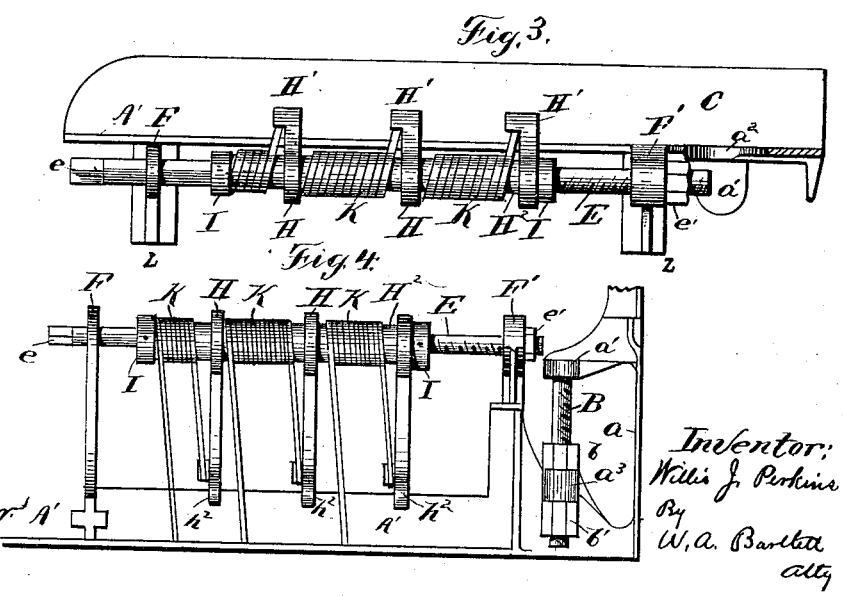
Witnesses:
Inventor:
Willis J. Perkins
By W. A. Bartlett
atty

United States Patent Office.

WILLIS J. PERKINS, OF GRAND RAPIDS, MICHIGAN.

CARRIAGE FOR SHINGLE-SAWING MACHINES.

SPECIFICATION forming part of Letters Patent No. 350,767, dated October 12, 1886.

Application filed March 12, 1886. Serial No. 194,974. (No model.)

*To all whom it may concern:*

Be it known that I, WILLIS J. PERKINS, residing at Grand Rapids, in the county of Kent and State of Michigan, have invented certain new and useful Improvements in Carriages for Shingle-Sawing Machines, of which the following is a specification, reference being had therein to the accompanying drawings.

This invention relates to saw-carriages for shingle-sawing machines, and is specially intended for use with a machine known as a "knot-saw machine," heretofore manufactured by me.

The object of this invention is to produce a light strong carriage of very few parts, to have the butting-piece integral with the carriage, and to have a gage by which the size of the shingles may be regulated so that "dimension" shingles may be easily produced.

In the drawings, Figure 1 is a plan view of my knot-saw carriage applied to a sawing-machine, the saw only being shown in full, and a saw-table indicated by dotted lines. Fig. 2 is an enlarged section on line $x\ x$, Fig. 1, looking toward the front edge of the carriage. Fig. 3 is an elevation and partial section on line $y\ y$, Fig. 1, looking toward the butting-piece. Fig. 4 is an under side view of the end of the carriage which has the butting-piece and gages. Fig. 5 is a view of one of the gages detached.

The frame A of the carriage is composed of a single piece of metal, which may be cast or forged. A part, $a$, is made sufficiently thin to have a slight flexibility. A lug, $a'$, beneath the projection $a^2$ on the frame, has a threaded piece, B, which passes through a hole in a depending lug, $a^3$, from the arm A' of the carriage. Nuts $b$ and $b'$ on the screw B serve to adjust the distance between the lugs $a'$ and $a^3$, and by this means turn the arm A' of the carriage a little away from its normal right-angled position with relation to the main or longitudinal bar of the frame, the elasticity of the metal at the part $a$ of the frame permitting all the movement necessary. The arm A' of the carriage has a flange, C, which forms the butt-plate against which the end of the shingle rests. The other end of the shingle rests on the arm D of the carriage. When the arm $a'$ is at a right angle to the line of carriage travel, the shingle butt being placed square against the butt-piece, the two sides of the shingle should be parallel when trimmed off by the saw; but in case of any error of alignment between slide-way, saw, or butt-piece on carriage, causing the shingles to be tapering in width, the same may be corrected by shifting the nuts $b$ and $b'$, thus changing the angle of the arm A'. The arm A' carries a shaft, E, supported in bearings in extension-braces F F'. This shaft has a screw engagement with the brace F', and may be moved longitudinally by turning the shaft, as by a key applied to the squared head $e$. The shaft may be secured by a lock-nut, $e'$. The shaft E carries a number of gages, H, each consisting of an arm, H', extending from a sleeve, H², the sleeve being free to oscillate on shaft E. The gages are held against endwise movement on the shaft by collars I I, secured by set-screws, or in other suitable manner. Each sleeve H² is surrounded by a spring, K, one end of said spring being held in the frame and the other end bearing against the under surface of arm H', or a projection, $h$, therefrom, thus pressing the arm upward until its depressed point $h'$ comes in contact with the bottom of the arm A' of the frame. All the gage-arms H' are thus held up a little above the level of the arm A' of the carriage. When a shingle is applied to the carriage, if it is only wide enough to cut to the size of the smallest dimension shingle, its edge which is farthest from the saw is placed against the edge of that gage which is nearest the saw. If it appears that the shingle will saw to a larger dimension, the operator places it on top of the gage nearest the saw, and it depresses that gage, and the edge away from the saw bears against the next gage. So if the shingle be very wide it may depress all the gages and will not then be trimmed to any specified dimension; but if placed against one of the gages and its end held against the butting-plate C the shingle will be trimmed by the saw to such dimension as the particular gage determines. The edge of the carriage runs close to the saw, being guided on the table by suitable ways, and as the carriage with a shingle thereon is moved toward the saw the edge of the shingle which projects at the side toward the saw will be trimmed off.

It is well known to the trade that shingles sawed to uniform widths, or dimension shingles, are more valuable than those of irregular widths. By this machine shingles of irregular widths, as shown from the bolt, may be quickly trimmed to dimension widths. By means of the spring-gages the operator can easily save the largest available dimension shingle from the irregular widths to be cut, and those of the same dimension will be packed together. The movement of the gage-shaft and its gages permits the regulation of the widths.

The slideway in which the carriage is guided may be of any usual construction for sawing-machines. The carriage is supported on the saw-table by legs L L, or in other suitable manner. The faces of the gage-arms when above the level of the floor of the carriage are inclined, so that a shingle will depress the arm while sliding toward the butt-rest.

I claim—

1. A shingle-saw carriage having its frame of suitable form, and having a slightly-flexible section joining the edge frame with the butt-stop frame, which stands at an angle thereto, substantially as set forth.

2. A shingle saw-carriage frame composed of suitable form having an arm at an angle to the edge frame, and having an adjusting-fastening by which the angle of the arm may be regulated with relation to the edge frame, substantially as set forth.

3. The combination, with the supporting-slideway of a sawing-machine, of a shingle carriage frame of suitable form having an arm at an angle to the side bar of the carriage, a flexible section between the side and the arm, and an adjusting-screw connecting the side bar and angle-arm, as set forth.

4. The combination, with the frame and butt-plate of a shingle-sawing machine, of a depressible gage having a determined relation to the operating edge of the carriage and to the butt-plate, as set forth.

5. The combination, with the shingle-saw-carriage, of a series of depressible gages and a single longitudinally-adjustable support for all the gages, so that the gages may be adjusted simultaneously, substantially as described.

6. The combination, with the saw-carriage, of a longitudinally-adjustable shaft supported thereon, a series of sleeved gages on said shaft, and a series of springs by which said gages are held in elevated position, as set forth.

7. The combination, with a shingle-saw carriage, of a longitudinally-adjustable shaft parallel to the plane of the surface of said carriage, a gage having a sleeve which may oscillate on said shaft, and a coiled spring surrounding said sleeve, by which said gage is held upward, substantially as described.

8. The skeleton frame of a shingle-saw carriage composed of a single piece having a side bar and two end bars at nearly a right angle to the side bar, one of the bars being connected to the main frame by a slightly-flexible section, as set forth.

In testimony whereof I affix my signature in presence of two witnesses.

WILLIS J. PERKINS.

Witnesses:
CORNELIUS J. DE YOUNG,
HIRAM H. PERKINS.